US012686379B2

(12) United States Patent
Yamada

(10) Patent No.: US 12,686,379 B2
(45) Date of Patent: Jul. 21, 2026

(54) HYBRID VEHICLE TRAVELING BY MOTOR TRAVELING MODE WITHIN PREDETERMINED DISTANCE RANGE FROM MOTOR TRAVELING SPOT

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/765,786

(22) Filed: Jul. 8, 2024

(65) Prior Publication Data

US 2025/0145145 A1 May 8, 2025

(30) Foreign Application Priority Data

Nov. 6, 2023 (JP) ................................. 2023-189581

(51) Int. Cl.
*B60W 20/20* (2016.01)
*B60K 6/42* (2007.10)
*B60W 10/06* (2006.01)
*B60W 10/08* (2006.01)

(52) U.S. Cl.
CPC ............ *B60W 20/20* (2013.01); *B60W 10/06* (2013.01); *B60W 10/08* (2013.01); *B60K 6/42* (2013.01); *B60W 2556/10* (2020.02); *B60Y 2200/92* (2013.01)

(58) Field of Classification Search
CPC ...... B60W 20/20; B60W 10/06; B60W 10/08; B60W 2556/10; B60W 20/40; B60W 20/12; B60K 6/42; B60Y 2200/92; Y02T 10/62
See application file for complete search history.

(56) References Cited

U.S. PATENT DOCUMENTS

| 2021/0024052 A1 | 1/2021 | Shimada et al. | |
| 2022/0219671 A1 | 7/2022 | Ogawa | |
| 2025/0196841 A1* | 6/2025 | Okuda | G01C 21/3469 |

FOREIGN PATENT DOCUMENTS

| DE | 112014004812 T5 | 7/2016 | |
| DE | 102021134481 A1 | 7/2022 | |
| DE | 102023123380 A1 | 5/2024 | |
| JP | H06-187595 A | 7/1994 | |
| JP | 2009280139 A * | 12/2009 | B60W 10/06 |
| JP | 2015-024774 A | 2/2015 | |
| JP | 2021-020511 A | 2/2021 | |
| WO | 2015/059883 A1 | 4/2015 | |

* cited by examiner

*Primary Examiner* — Brian P Sweeney
(74) *Attorney, Agent, or Firm* — SoraIP, Inc.

(57) ABSTRACT

A control apparatus of a hybrid electric vehicle sets ON a motor traveling history when a place within a predetermined distance range from a motor traveling spot is reached and traveling is started by a motor traveling mode, and performs control such that traveling is performed by the motor traveling mode when a motor traveling history is ON when a system is activated.

5 Claims, 3 Drawing Sheets

FIG. 3

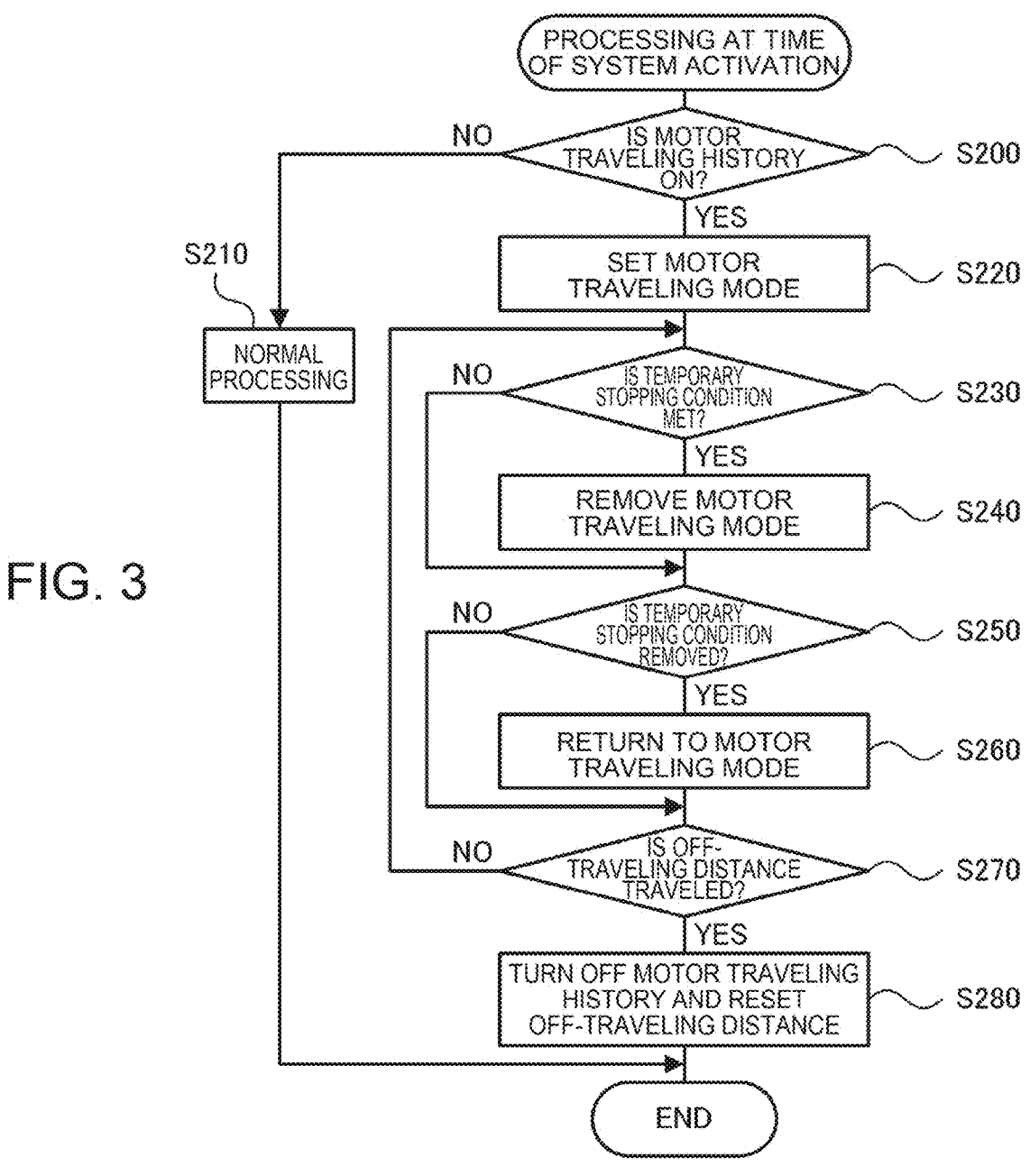

PROCESSING AT TIME OF SYSTEM ACTIVATION

IS MOTOR TRAVELING HISTORY ON? — S200

NO

S210

NORMAL PROCESSING

YES

SET MOTOR TRAVELING MODE — S220

IS TEMPORARY STOPPING CONDITION MET? — S230

NO

YES

REMOVE MOTOR TRAVELING MODE — S240

IS TEMPORARY STOPPING CONDITION REMOVED? — S250

NO

YES

RETURN TO MOTOR TRAVELING MODE — S260

IS OFF-TRAVELING DISTANCE TRAVELED? — S270

NO

YES

TURN OFF MOTOR TRAVELING HISTORY AND RESET OFF-TRAVELING DISTANCE — S280

END

FIG. 4

HOME

P1    Pev    P2

MOTOR TRAVELING MODE

HYBRID VEHICLE TRAVELING BY MOTOR TRAVELING MODE WITHIN PREDETERMINED DISTANCE RANGE FROM MOTOR TRAVELING SPOT

CROSS-REFERENCE TO RELATED APPLICATION

This application claims priority to Japanese Patent Application No. 2023-189581 filed on Nov. 6, 2023, incorporated herein by reference in its entirety.

BACKGROUND

1. Technical Field

The present disclosure relates to a hybrid electric vehicle.

2. Description of Related Art

Hitherto, as a hybrid electric vehicle of this type, a hybrid electric vehicle that switches between each of modes, that is, an electric motor mode that travels by an electric motor alone, an engine mode that travels by an engine alone, and a combined mode using both in accordance with a mode switching vehicle speed has been proposed (for example, see Japanese Unexamined Patent Application Publication No. 06-187595). The hybrid electric vehicle enables traveling adapted to the environment by switching the mode switching vehicle speed for each of various environments such as an urban area, suburbs, a highway, and a tunnel.

SUMMARY

In recent years, there are cases in which a user sets a home as a motor traveling spot and sets a predetermined distance range from the set motor traveling spot as a motor traveling region in order to reduce noise around the home. At this time, the motor traveling spot and the motor traveling region are set on a road on a map. Therefore, when the motor traveling spot is reached and then traveling is performed on a passage route in a private land that is not recognized as a road on the map and a system is stopped, it becomes difficult to specify the current location on the map when the system is activated thereafter, and cases in which an engine is started immediately after the system activation occur.

A main object of a hybrid electric vehicle of the present disclosure is to enable traveling by motor traveling even when a motor traveling spot is reached, a passage route in a private land or the like is then traveled, a system is stopped, and the system is then activated.

The hybrid electric vehicle of the present disclosure has taken the following measures in order to achieve the main object described above.

A hybrid electric vehicle of the present disclosure includes:

an engine capable of outputting motive power for traveling;

a motor capable of outputting motive power for traveling;

an electricity accumulation apparatus capable of exchanging electricity with the motor;

a map information storage apparatus that stores map information; and a control apparatus that performs, when the control apparatus controls the engine and the motor by switching between a motor traveling mode that performs motor traveling that travels by the motive power from the motor in a state in which operation of the engine is stopped and a normal traveling mode that performs normal traveling that travels by the motive power from the engine and the motive power from the motor as needed, control such that traveling is performed by the motor traveling mode within a predetermined distance range from a motor traveling spot set on map information.

In the hybrid electric vehicle, the control apparatus:

sets ON a motor traveling history when a place within the predetermined distance range from the motor traveling spot is reached and traveling is started by the motor traveling mode; and performs control such that traveling is performed by the motor traveling mode when the motor traveling history is ON when a system is activated.

The hybrid electric vehicle of the present disclosure includes: the engine capable of outputting the motive power for traveling; the motor capable of outputting the motive power for traveling; the electricity accumulation apparatus capable of exchanging electricity with the motor; and the control apparatus that controls the engine and the motor by switching between the motor traveling mode that performs motor traveling that travels by the motive power from the motor in a state in which operation of the engine is stopped and the normal traveling mode that performs normal traveling that travels by the motive power from the engine and the motive power from the motor as needed. The control apparatus performs control such that traveling is performed by the motor traveling mode within the predetermined distance range from the motor traveling spot set on the map information. At this time, the motor traveling history is set ON when a place within the predetermined distance range from the motor traveling spot is reached and traveling is started by the motor traveling mode. The control apparatus performs control such that traveling is performed by the motor traveling mode when the motor traveling history is ON when the system is activated. As a result, it becomes possible to enable traveling by motor traveling even when the motor traveling spot is reached, a passage route in the private land or the like is then traveled, the system is stopped, and the system is then activated.

In the hybrid electric vehicle of the present disclosure, the control apparatus may: store a traveling distance of a predetermined period of time from when the motor traveling spot is reached in the control apparatus; and perform control such that traveling is performed by the motor traveling mode for at least the traveling distance from a spot at which the system is activated when the motor traveling history is ON when the system is activated. As a result, even when the traveling distance from the time the motor traveling spot is reached becomes long, traveling by the motor traveling mode can be performed at least until the traveling distance is traveled after the system activation thereafter. Here, the predetermined period of time includes a period of time from when the motor traveling mode after the motor traveling spot is reached is started to when the system is turned OFF and a period of time from when traveling on an off-road (a road that is not a public road and the like) is started after the motor traveling spot is reached to when the system is turned OFF.

In the hybrid electric vehicle of the present disclosure, the control apparatus may turn the motor traveling history OFF and end the motor traveling mode even when a distance equal to or more than a traveling distance is not traveled by the motor traveling mode when a predetermined cancellation condition is met when the motor traveling history is ON. In this case, the predetermined cancellation condition may include at least one of a condition in which it is determined that the motor traveling spot has been passed through or a condition in which a driver has given a request to end the motor traveling mode. The condition in which the driver has given a request to end the motor traveling mode includes a case in which the cancellation of the motor traveling mode is operated by the driver with use of switch operation or remote operation, for example.

In the hybrid electric vehicle of the present disclosure, the control apparatus may stop the motor traveling mode while maintaining the motor traveling history ON when at least one of a case in which a predetermined vehicle speed or more is reached or an electricity accumulation ratio of the electricity accumulation apparatus becomes less than a predetermined ratio is established when the motor traveling mode is performed in accordance with the motor traveling history being ON, and then restart the motor traveling mode when a speed less than the predetermined vehicle speed is reached or the electricity accumulation ratio of the electricity accumulation apparatus becomes equal to or more than the predetermined ratio in a state in which the motor traveling history is ON. In other words, when the motor traveling history is ON, the motor traveling mode is temporarily stopped when the predetermined vehicle speed or more is reached or the electricity accumulation ratio of the electricity accumulation apparatus becomes less than the predetermined ratio. Then, when the speed less than the predetermined vehicle speed is reached or the electricity accumulation ratio of the electricity accumulation apparatus becomes equal to or more than the predetermined ratio, the motor traveling mode is restarted. As a result, even when the motor traveling mode is temporarily stopped as a result of the condition in which the motor traveling mode cannot be maintained being met when the motor traveling history is ON, return can be made to the motor traveling mode when a state in which the motor traveling mode is possible returns.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing one example of processing at the time of system activation executed by the hybrid ECU 50; and FIG. 4 is an explanatory diagram showing one example of how a traveling mode is set when a home is set as a motor traveling spot.

DETAILED DESCRIPTION OF EMBODIMENTS

Figure 1:
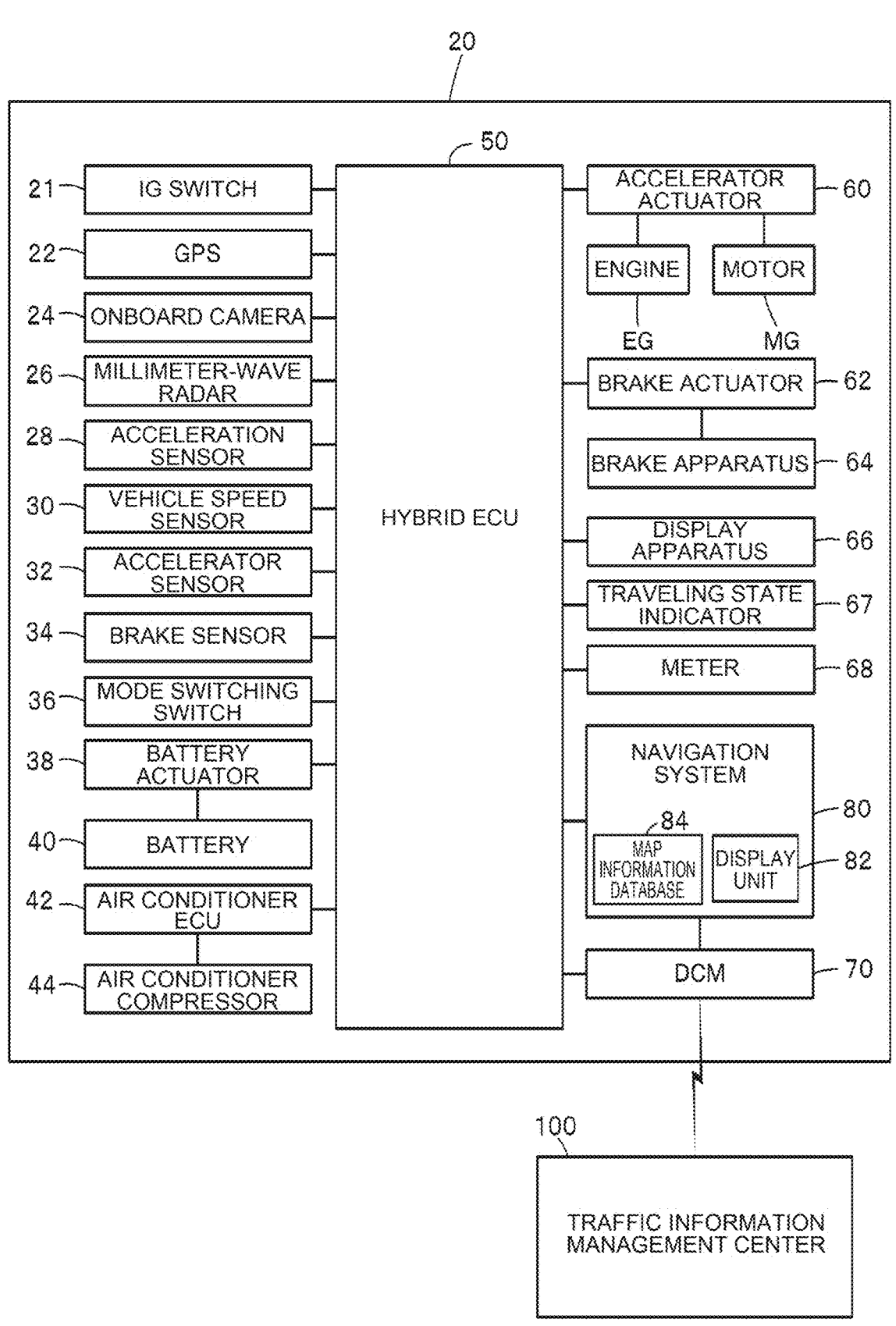
FIG. 1 is a block diagram showing one example of a hybrid electric automobile 20 as one embodiment of the present disclosure as blocks centering around a hybrid ECU 50.

Next, a form (embodiment) for carrying out the present disclosure is described. FIG. 1 is a block diagram showing one example of a hybrid electric automobile 20 as one embodiment of the present disclosure as blocks centering around a hybrid electronic control unit (hereinafter referred to as a hybrid ECU) 50. As shown in the drawing, the hybrid electric automobile 20 of the embodiment includes an engine EG and a motor MG as power sources. The hybrid electric automobile 20 of the embodiment has a motor traveling mode that travels by a motive power from the motor MG in a state in which the operation of the engine EG is stopped, and a normal traveling mode that travels by a motive power from the engine EG and the motive power from the motor MG by operating the engine EG as needed as traveling modes. The normal traveling mode includes a charge depleting mode (CD mode) that prioritizes electric traveling so as to reduce an electricity accumulation ratio SOC of the battery 40, and a charge sustaining mode (CS mode) that uses both of the electric traveling and hybrid traveling so as to maintain the electricity accumulation ratio SOC of the battery 40 at a target ratio.

The hybrid electric automobile 20 of the embodiment includes an ignition switch 21, a global positioning system (GPS, global positioning satellite) 22, an onboard camera 24, a millimeter-wave radar 26, an acceleration sensor 28, a vehicle speed sensor 30, an accelerator sensor 32, a brake sensor 34, a mode switching switch 36, a battery actuator 38, a battery 40, an air conditioner electronic control unit (hereinafter referred to as an air conditioner ECU) 42, an air conditioner compressor 44, a hybrid ECU 50, an accelerator actuator 60, a brake actuator 62, a brake apparatus 64, a display apparatus 66, a traveling state indicator 67, a meter 68, a data communication module (DCM) 70, a navigation system 80, and the like besides the power source.

The GPS 22 is an apparatus that detects the location of a vehicle on the basis of signals transmitted from a plurality of GPS satellites. The onboard camera 24 is a camera that images the periphery of the vehicle, and a front camera that images a place ahead of the vehicle, a rear camera that images a place behind the vehicle, and the like correspond thereto, for example. The millimeter-wave radar 26 detects the inter-vehicular distance or the relative speed between an own vehicle and a vehicle ahead and detects the inter-vehicular distance and the relative speed between the own vehicle and a vehicle behind.

The acceleration sensor 28 is a sensor that detects the acceleration of the vehicle in the front-rear direction and detects the acceleration of the vehicle in the left-right direction (lateral direction), for example. The vehicle speed sensor 30 detects the vehicle speed of the vehicle on the basis of the wheel speed and the like. The accelerator sensor 32 detects an accelerator operation amount and the like in accordance with the depression amount of an accelerator pedal by a driver. The brake sensor 34 detects the brake position as the depression amount of a brake pedal by the driver and the like. The mode switching switch 36 is disposed in the vicinity of a steering wheel of a driving seat and is a switch for performing switching between the motor traveling mode and the normal traveling mode.

The battery actuator 38 detects the state of the battery 40, for example, voltage across terminals, charge and discharge current, and battery temperature, and manages the battery 40 on the basis of the above. The battery actuator 38 calculates the electricity accumulation ratio SOC as a ratio of a remaining electricity accumulation capacity to the entire electricity accumulation capacity on the basis of the charge and discharge current and calculates a maximum permissible output electricity (output limit Wout) that may be output from the battery 40 and a maximum permissible input electricity (input limit Win) that may be input to the battery 40 on the basis of the electricity accumulation ratio SOC, the battery temperature, and the like. The battery 40 is configured as a chargeable and dischargeable secondary battery, and a lithium-ion battery, a nickel hydride battery, and a lead storage battery, for example, can be used.

The air conditioner ECU 42 is configured as a microcomputer centering around a CPU (not shown) and includes a ROM, a RAM, a flash memory, an input port, an output port, a communication port, and the like besides the CPU. The air conditioner ECU 42 is integrated in an air conditioning apparatus that performs air conditioning of a passenger compartment and controls the driving of the air conditioner compressor 44 in the air conditioning apparatus such that the temperature of the passenger compartment reaches a set temperature.

The engine EG is configured as an internal combustion engine, for example. The motor MG is configured as an electric motor that also functions as an electricity generator such as a synchronous generator-motor, for example. The motor MG is connected to the battery 40 via an inverter (not shown) and can output a driving force with use of electricity supplied from the battery 40 and charge the battery 40 by generated electricity.

The hybrid ECU 50 is configured as a microcomputer centering around a CPU (not shown) and includes a ROM, a RAM, a flash memory, an input port, an output port, a communication port, and the like besides the CPU. The hybrid ECU 50 sets the traveling mode and sets a target operation point (a target rotational speed and a target torque) of the engine EG and a torque command of the motor MG on the basis of the set traveling mode, the accelerator operation amount from the accelerator sensor 32, the brake position from the brake sensor 34, and an output limit and an input limit from the battery actuator 38. The hybrid ECU 50 is not activated by accessory ON and is activated by ready ON.

When motor traveling is performed, the hybrid ECU 50 sets a requested driving force and a requested power on the basis of the accelerator operation amount from the accelerator sensor 32 and the vehicle speed from the vehicle speed sensor 30, sets a torque command of the motor MG so as to output the requested driving force and the requested power to the vehicle, and transmits the set torque command to the accelerator actuator 60. When hybrid traveling is performed, the hybrid ECU 50 sets a target operation point of the engine EG and a torque command of the motor MG so as to output the requested driving force and the requested power to the vehicle and transmits the target operation point and the torque command to the accelerator actuator 60. When the brake pedal is depressed, the hybrid ECU 50 sets a requested braking force on the basis of the brake position from the brake sensor 34 and the vehicle speed from the vehicle speed sensor 30, sets a regeneration torque command for performing regeneration control of the motor MG on the basis of the requested braking force and the vehicle speed, sets a target braking force by the brake apparatus, transmits the torque command to the accelerator actuator 60, and transmits the target braking force to the brake actuator 62.

The accelerator actuator 60 performs drive control of the engine EG and the motor MG by the target operation point and the torque command set by the hybrid ECU 50. The accelerator actuator 60 performs intake air volume control, fuel injection control, ignition control, intake valve opening-closing timing control, and the like such that the engine EG is operated at the target operation point (the target rotational speed and the target torque). The accelerator actuator 60 performs switching control of a switching element having an inverter for driving the motor MG such that a torque equivalent to the torque command is output from the motor MG.

The brake actuator 62 controls the brake apparatus 64 such that the target braking force set by the hybrid ECU 50 acts on the vehicle by the brake apparatus 64. The brake apparatus 64 is configured as a hydraulically-driven friction brake, for example.

The display apparatus 66 is integrated in an instrument panel in front of the driving seat, for example, and displays various information and also functions as a touch panel. The traveling state indicator 67 has an EV indicator and an HV indicator (not shown). The EV indicator is lit up and the HV indicator is turned off when motor traveling is performed, and the EV indicator is turned off and the HV indicator is lit up when hybrid traveling is performed. The meter 68 is integrated in the instrument panel in front of the driving seat, for example.

The data communication module (DCM) 70 transmits information on the own vehicle to a traffic information management center 100 and receives road traffic information from the traffic information management center 100. Examples of the information on the own vehicle include the location, the vehicle speed, the traveling power, the traveling mode, and the like of the own vehicle. Examples of the road traffic information include information relating to current and future traffic jams, information relating to prediction values of the current average vehicle speed and the future average vehicle speed in a section in a traveling route, information relating to traffic regulations, information relating to weather, information relating to a road surface state, information relating to a map, and the like. The DCM 70 communicates with the traffic information management center 100 at a predetermined interval (for example, every 30 seconds, every minute, or every two minutes).

The navigation system 80 is a system that guides the own vehicle to a set destination and includes a display unit 82 and a map information database 84. The display unit 82 is a functional block having a function that displays a route to a destination and an own car location on the display apparatus 66 on the basis of map information. The navigation system 80 communicates with the traffic information management center 100 via the data communication module (DCM) 70. When a destination and a transit point are set, the navigation system 80 sets a route on the basis of information on the destination and the transit point, information on a current location (the current location of the own vehicle) acquired by the GPS 22, and information stored in the map information database 84. The navigation system 80 acquires road traffic information by communicating with the traffic information management center 100 every predetermined amount of time (for example, every three minutes or every five minutes) and performs route guidance on the basis of the road traffic information. The map information stored in the map information database 84 does not only include data as a map but also includes the road gradient, the type of the road, the elevation, and the like of each traveling section.

When the navigation system 80 performs route guidance, the navigation system 80 generates load information and the like necessary for traveling in each traveling section as anticipatory information on the basis of information relating to a traveling load and information on each traveling section in the traveling route out of the road traffic information acquired from the traffic information management center 100, the vehicle speed of the own vehicle, the traveling power of the own vehicle, the traveling mode of the own vehicle, and the like and transmits the anticipatory information to the hybrid ECU 50 each time the road traffic information is acquired from the traffic information management center 100 (or every predetermined amount of time). The anticipatory information also includes information on the own vehicle such as the location, the vehicle speed, the traveling power, the traveling mode of the own vehicle, information relating to current and future traffic jams, information relating to prediction values of the current average vehicle speed and the future average vehicle speed in a section in the traveling route, information relating to traffic regulations, information relating to weather, information relating to a road surface state, information relating to the map, and the like. The information relating to the map also includes a region (motor traveling region) in which motor traveling is to be performed and which is defined by municipalities and the like, for example. The navigation system 80 can also set a motor traveling region by specifying regions such as a region in the vicinity of a home by user operation. The navigation system 80 transmits a signal indicating whether the region is the motor traveling region to the hybrid ECU 50 when the own vehicle travels.

Figure 2:
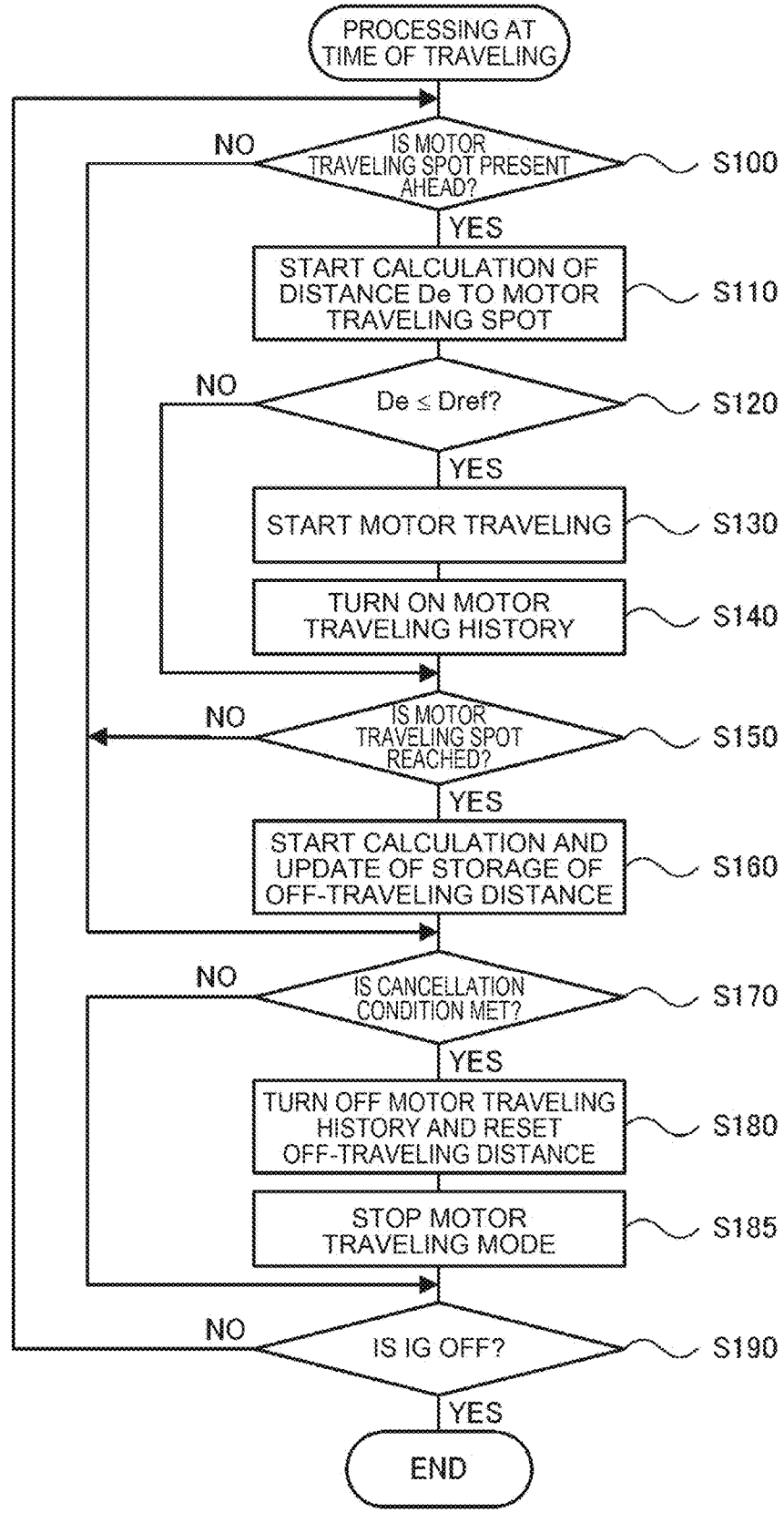
FIG. 2 is a flowchart showing one example of processing at the time of traveling executed by the hybrid ECU 50.

Next, the operation in the hybrid electric automobile 20 configured as above, in particular, the operation when the motor traveling spot is reached or when the system is activated thereafter is described. The motor traveling spot is set as a spot reached by motor traveling by a user and the like. FIG. 2 is a flowchart showing one example of processing at the time of traveling executed by the hybrid ECU 50, and FIG. 3 is a flowchart showing one example of processing at the time of system activation executed by the hybrid ECU 50. The processing at the time of traveling in FIG. 2 is executed after system activation processing is ended, and the processing at the time of system activation in FIG. 3 is executed at the time of system activation when the ignition switch 21 is turned ON. Description is made in order below.

When the processing at the time of traveling in FIG. 2 is executed, the hybrid ECU 50 determines whether a motor traveling spot is present ahead (Step S100). This determination can be performed by determining whether a motor traveling spot is set within a predetermined distance (for example, 500 m or 1000 m) ahead in the traveling direction, for example. When it is determined that a motor traveling spot is present ahead, processing of calculating a distance De from the current location of an own car to the motor traveling spot is started (Step S110).

Then, it is determined whether the distance De to the motor traveling spot has reached a motor traveling range Dref (Step S120). When it is determined that the distance De to the motor traveling spot has reached the motor traveling range Dref, the motor traveling mode is set as the traveling mode and motor traveling is started (Step S130), and a motor traveling history is turned ON (Step S140).

Next, it is determined whether the motor traveling spot is reached (Step S150). When it is determined that the motor traveling spot is reached, calculation of an off-traveling distance by which traveling on an off-road such as a passage route in a private land that is not acknowledged as a road on the map information has been performed and the update of storage of the off-traveling distance are started (Step S160).

Next, it is determined whether a cancellation condition for turning OFF the turned ON motor traveling history and resetting the off-traveling distance to a value of 0 is met (Step S170). When it is determined that the cancellation condition is met, the motor traveling history is turned OFF and the off-traveling distance is reset to a value of 0 (Step S180), and the motor traveling mode is stopped and the normal traveling mode is set (Step S185). Examples of the cancellation condition include a condition in which it is determined that the motor traveling spot has been passed through, the time when an operation of stopping the motor traveling by remote operation or an operation of the mode switching switch 36 by a driver is performed, and the like. As the condition in which it is determined that the motor traveling spot has been passed through, a condition in which a predetermined distance (for example, 50 m or 100 m) has been traveled after the motor traveling spot has been passed through can be used.

Then, it is determined whether the ignition switch 21 is turned OFF (IG OFF) (Step S190). When it is determined that IG OFF is not performed, the processing returns to the processing of determining whether a motor traveling spot is present ahead in Step S100. When it is determined that IG OFF is performed, the present processing is ended. The IG OFF is performed in a state in which the motor traveling history and the off-traveling distance are stored. Therefore, when IG OFF is performed at the time the update of storage of the off-traveling distance starts or thereafter, it is stored that the motor traveling history is ON, and the traveling distance from the motor traveling spot to a spot at which IG OFF is performed is stored as the off-traveling distance.

When it is determined that a motor traveling spot is not present ahead in Step S100, the processing proceeds to the processing of determining whether the cancellation condition in Step S170 is met.

Now, a case in which the home is set as the motor traveling spot and traveling is performed toward the home is considered. The state of the case is shown in FIG. 4. In FIG. 4, the home is present in a place ahead of a passage route (a passage route indicated by a broken line in the drawing) in a private land that is not recognized as a road on the map. In this case, the motor traveling spot is set to a spot Pev on a road on the map. When the own car travels the road on the map toward the home and a spot P1 at which the distance to the motor traveling spot Pev is the motor traveling range Dref is reached, the traveling mode is set to the motor traveling mode, the motor traveling is started, and the motor traveling history is turned ON. Then, when the own car reaches the motor traveling spot Pev, the calculation of the off-traveling distance is started, and the update of the storage of the off-traveling distance is started. Then, IG OFF is performed when parking is performed at a parking space at the home or thereafter. In FIG. 4, when the motor traveling spot Pev is passed through, the passage route in the private land in the broken line is traveled, the vehicle is stopped at the parking space at the home, and IG OFF is performed, a state in which it is stored that the motor traveling history is ON and the distance of the passage route in the broken line is stored as the off-traveling distance is obtained.

The home is set to the motor traveling spot, but a case in which the home is passed through is considered. When the spot P1 at which the distance to the motor traveling spot Pev reaches the motor traveling range Dref is reached, the traveling mode is set to the motor traveling mode, the motor traveling is started, and the motor traveling history is turned ON in this case as well. When the motor traveling spot Pev is reached, the calculation of the off-traveling distance is started, and the update of the storage of the off-traveling distance is started. Then, when a spot P2 is reached, the cancellation condition is met, the motor traveling history is turned OFF, and the off-traveling distance is reset to a value of 0.

Next, the processing at the time of system activation in FIG. 3 is described. When the processing at the time of system activation is executed, the hybrid ECU 50 first determines whether it is stored that the motor traveling history is ON (Step S200). When it is determined that it is not stored that the motor traveling history is ON, normal system activation processing is performed (Step S210), and the present processing is ended.

When it is determined that it is stored that the motor traveling history is ON in Step S200, the motor traveling mode is set, and the motor traveling is started (Step S220). Then, basically, it is waited until the off-traveling distance is traveled (Step S270), the motor traveling history is turned OFF and the off-traveling distance is reset to a value of 0 (Step S280), and the present processing is ended. It is determined whether a condition for temporarily stopping the motor traveling (temporary stopping condition) is met until the off-traveling distance is traveled (Step S230). When it is determined that the temporary stopping condition is met, processing of removing the motor traveling mode is performed (Step S240), and it is determined whether the temporary stopping condition is removed (Step S250). When it is determined that the temporary stopping condition is removed, processing of returning to the motor traveling mode (Step S260) is repeated. Examples of the temporary stopping condition include a condition in which the vehicle speed V has become equal to or more than a predetermined vehicle speed, a condition in which the electricity accumulation ratio SOC of the battery 40 has become less than a predetermined electricity accumulation ratio (for example, 5% or 10%), and the like. The motor traveling history is not turned OFF even when the temporary stopping condition is met in Step S230.

A case in which IG ON is performed at the home in FIG. 4 is considered. IG ON is performed in a state in which the motor traveling history is ON, and hence the motor traveling mode is set as the traveling mode, and traveling is performed by motor traveling. The motor traveling mode is continued until the distance of the passage route in the private land in the broken line in the drawing is traveled as the off-traveling distance, and hence traveling is performed by motor traveling until the motor traveling spot Pev. Then, when the cancellation condition is met, the motor traveling history is turned OFF, the off-traveling distance is reset to a value of 0, and traveling is performed by the normal traveling mode.

In the hybrid electric automobile 20 of the embodiment described above, the motor traveling history is set ON when a place within the predetermined distance range from the motor traveling spot is reached and traveling is started by the motor traveling mode. Then, when the motor traveling history is ON when the system is activated, traveling is performed by the motor traveling mode. Therefore, it becomes possible to enable traveling by motor traveling even when the motor traveling spot is reached, the passage route in the private land or the like is then traveled, the system is stopped, and the system is then activated.

In the hybrid electric automobile 20 of the embodiment, the traveling distance on the off-road is stored as the off-traveling distance when traveling is performed on the off-road that is not recognized as a road on the map from the time the motor traveling spot is reached, and then the motor traveling is continued until the off-traveling distance is traveled from the system is activated spot when the motor traveling history is ON when the system is activated. As a result, even when the traveling distance on the off-road from the time the motor traveling spot is reached becomes long, motor traveling can be performed until the traveling distance on the off-road is traveled after the system activation thereafter.

In the hybrid electric automobile 20 of the embodiment, the motor traveling history is turned OFF and the off-traveling distance is reset to a value of 0 when the cancellation condition such as the condition in which it is determined that the motor traveling spot has been passed through and the condition in which the operation of stopping the motor traveling is performed by the remote operation or the operation of the mode switching switch 36 by the driver. As a result, it becomes possible to reduce cases in which a state in which the motor traveling history is ON or a state in which the off-traveling distance is not reset is continued.

In the hybrid electric automobile 20 of the embodiment, motor traveling is temporarily removed when the temporary stopping condition such as the condition in which the vehicle speed V has become equal to or more than the predetermined vehicle speed and the condition in which the electricity accumulation ratio SOC of the battery 40 has become less than the predetermined electricity accumulation ratio is met in the middle of motor traveling in accordance with the motor traveling history being ON after the system activation, and return is made to motor traveling when the temporary stopping condition is removed. As a result, motor traveling can be performed more.

In the hybrid electric automobile 20 of the embodiment, a case in which a home is set as the motor traveling spot has been described. However, a similar application can be made to a case in which a spot other than the home is set as the motor traveling spot. The correspondence relationship between the main components of the embodiment and the main components of the disclosure described in the column of the summary of the disclosure is described. In the embodiment, the engine EG is equivalent to the "engine", the motor MG is equivalent to the "motor", the battery 40 is equivalent to the "electricity accumulation apparatus", the navigation system 80 having the map information database 84 is equivalent to the "map information storage apparatus", and the hybrid electronic control unit 50 is equivalent to the "control apparatus".

The correspondence relationship between the main components of the embodiment and the main components of the disclosure described in the column of the summary of the disclosure is one example for specifically describing forms for carrying out the disclosure described in the column of the summary of the disclosure by the embodiments, and hence does not limit elements of the disclosure described in the column of the summary of the disclosure. In other words, interpretation regarding the disclosure described in the column of the summary of the disclosure is to be performed on the basis of the wordings in the column, and the embodiment is merely one specific example of the disclosure described in the column of the summary of the disclosure.

The present disclosure has been described with use of the embodiment above, but the present disclosure is not limited to such embodiment at all, and it goes without saying that the present disclosure may be carried out in various forms without departing from the gist of the present disclosure.

The present disclosure can be used in an industry of manufacturing hybrid electric vehicles and the like.

What is claimed is:

1. A hybrid electric vehicle, comprising:

an engine capable of outputting motive power for traveling;

a motor capable of outputting motive power for traveling;

a battery capable of exchanging electricity with the motor;

an ignition switch for activating a system of the hybrid electric vehicle;

a map information database that stores map information; and a processor that is configured to perform, when the processor controls the engine and the motor by switching between a motor traveling mode that performs motor traveling that travels by the motive power from the motor in a state in which operation of the engine is stopped and a normal traveling mode that performs normal traveling that travels by the motive power from the engine and the motive power from the motor as needed, control such that traveling is performed by the motor traveling mode within a predetermined distance range from a motor traveling spot set on the map information, wherein the processor is configured to:

set ON a motor traveling history when a place within the predetermined distance range from the motor traveling spot is reached and traveling is started by the motor traveling mode;

determine whether the motor traveling history is ON when the ignition switch is turned ON after being turned OFF; and perform control such that traveling is performed by the motor traveling mode in a case where the processor determines that the motor traveling history is ON.

2. The hybrid electric vehicle according to claim 1, wherein the processor is further configured to:

store a traveling distance of a predetermined period of time from when the motor traveling spot is reached; and perform control such that traveling is performed by the motor traveling mode for at least the traveling distance from a spot at which the system is activated in the case where the processor determines that the motor traveling history is ON.

3. The hybrid electric vehicle according to claim 2, wherein the processor is further configured to turn the motor traveling history OFF and ends the motor traveling mode even when a distance equal to or more than the traveling distance is not traveled by the motor traveling mode in a case where the processor determines that the motor traveling history is ON and a predetermined cancellation condition is met.

4. The hybrid electric vehicle according to claim 3, wherein the predetermined cancellation condition includes at least one of a first condition in which it is determined that the motor traveling spot has been passed through and a second condition in which a driver has given a request to end the motor traveling mode.

5. The hybrid electric vehicle according to claim 1, wherein the processor is further configured to stop the motor traveling mode while maintaining the motor traveling history ON when at least one of a first case in which a predetermined vehicle speed or more is reached and a second case in which an electricity accumulation ratio of the battery becomes less than a predetermined ratio is established when the motor traveling mode is performed in accordance with the motor traveling history being ON, and then restart the motor traveling mode when a speed less than the predetermined vehicle speed is reached or the electricity accumulation ratio of the battery becomes equal to or more than the predetermined ratio in a state in which the motor traveling history is ON.

* * * * *